June 21, 1932.   W. W. DRYDEN   1,864,343
MEAT GRINDER
Original Filed March 26, 1930   2 Sheets-Sheet 1
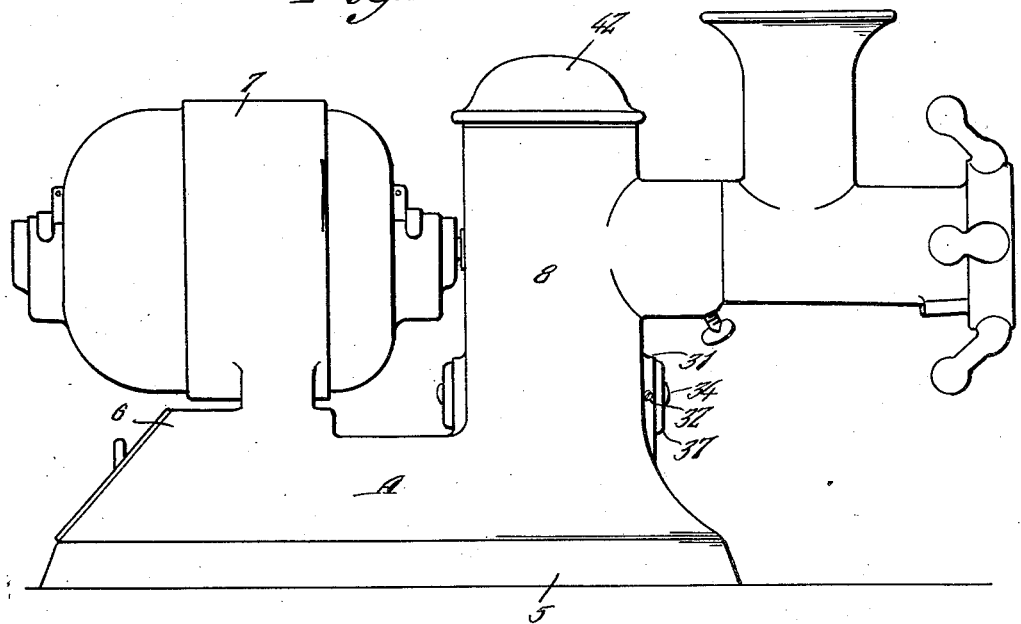
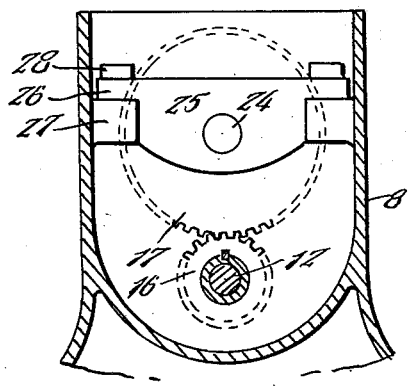
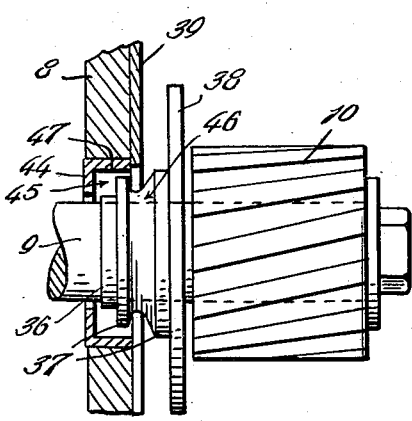
Inventor
William W. Dryden
By Clarence A. O'Brien
Attorney

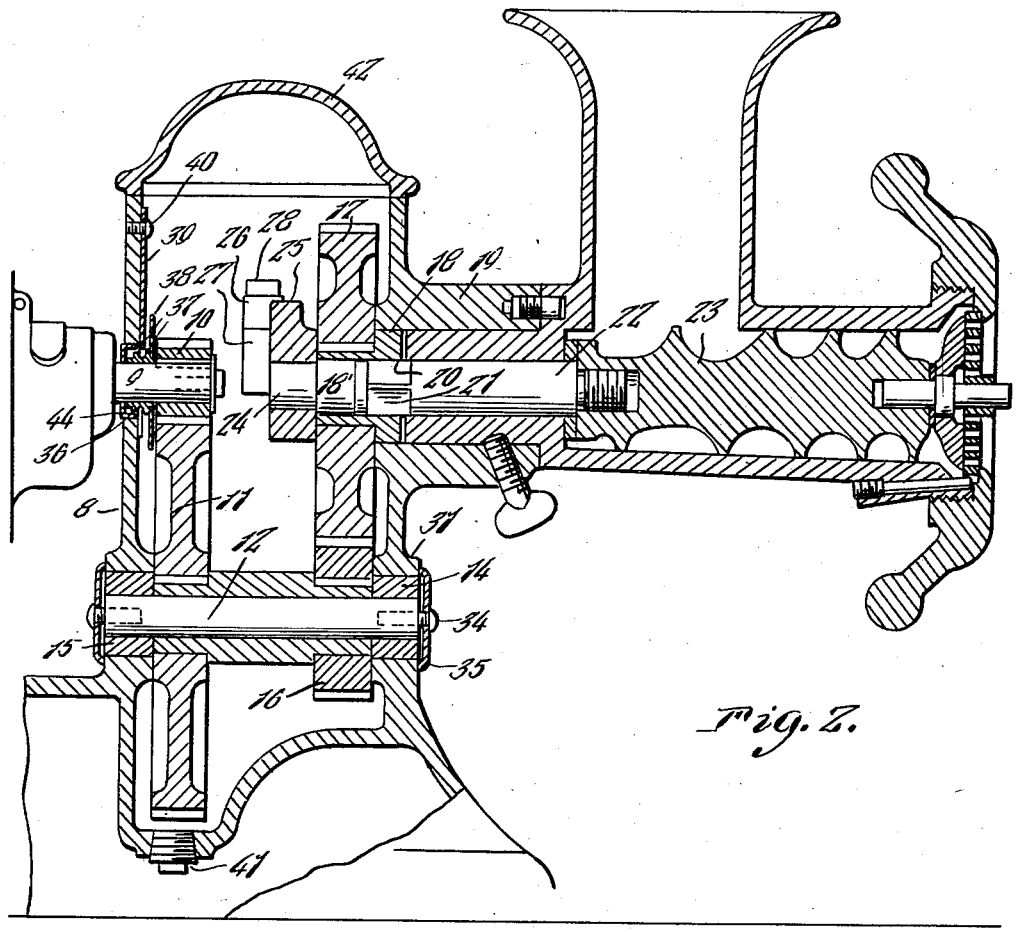
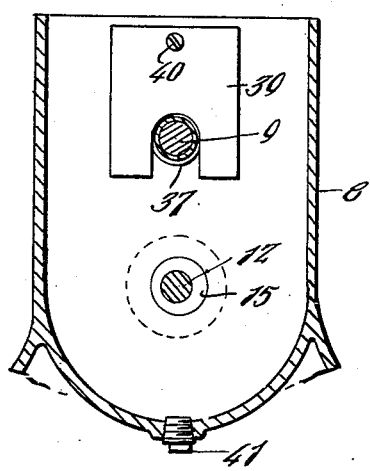
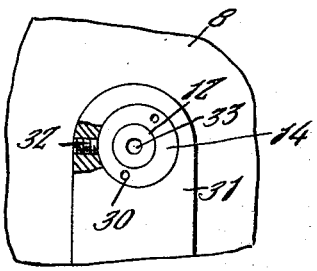
Inventor
William W. Dryden
By Clarence A O'Brien
Attorney Patented June 21, 1932

1,864,343

UNITED STATES PATENT OFFICE

WILLIAM W. DRYDEN, OF LOUISVILLE, KENTUCKY, ASSIGNOR TO WALTER F. STIMPSON, OF DETROIT, MICHIGAN

MEAT GRINDER

Application filed March 26, 1930, Serial No. 439,152. Renewed November 9, 1931.

The present invention relates to meat grinders and more particularly to a gearing assembly for operatively connecting the drive shaft of an electric motor with the driven shaft for the screw of the grinder.

The present invention has for its principal object to provide a gearing assembly for the meat grinder which includes an adjustable counter shaft for regulating the meshing of the gears and a removable journal for the gear of the driven shaft to facilitate its removal and replacement when necessary or for cleaning purposes.

A further object is to provide a housing for the gears suitable for containing a quantity of lubricant and to provide a splash shield for the inner end of the drive shaft to prevent the seepage of the lubricant from the housing.

Other objects and advantages reside in the special construction, combination and arrangement of the various elements forming the invention as more fully hereinafter described and claimed, reference being had to the accompanying drawings forming part hereof, wherein like numerals refer to like parts throughout, and in which:

Figure 1 is a side elevational view of the complete grinding machine,

Figure 2 is a fragmentary longitudinal sectional view through the gear housing,

Figure 3 is a vertical sectional view through the housing and drive shaft illustrating the splash shield, Figure 4 is a detail of one of the eccentric bushings for the counter shaft, Figure 5 is a fragmentary vertical sectional view through the housing illustrating the removable journal for the driven gear, Figure 6 is a perspective view of the splash shield for the drive shaft.

Referring to the drawings in detail it will be seen that the letter A denotes generally a casting including a base 5 formed at one end with a platform 6 on which rests an electric motor 7, while at the other end a gear casing 8 rises from the base, the bottom of the casing or housing being closed and its top open. The armature shaft 9 of the motor 7 is journalled through the rear wall of the casing with a pinion 10 keyed on the inner end thereof meshing with a gear 11 on a counter shaft 12 journalled in eccentric bushings 14 and 15 in the front and rear walls of the casing. The counter shaft is also provided with a pinion gear 16 meshing with a driven gear 17 keyed on a hollow hub 18 journalled in a bearing extension 19 formed on the front wall of the casing. The hub 18 is formed with a non-circular recess 20 within which is fitted a complementary end 21 of a driven shaft 22 for the screw 23 of the grinder.

A stub shaft 18' is removably fitted in the hub with one end protruding from the side of the hub oppositely from the shaft 22 to form a trunnion 24 which is journalled in a removable hanger 25 having apertured arms 26 supported on bosses 27 formed on the inner wall of the casing and secured thereto by bolts 28.

By reason of this construction it will be apparent that the gear 17 may be conveniently removed from the casing for the purpose of repair or replacement when desired.

The eccentric bushings 14 and 15 for the counter shaft 12 are provided with diametrically opposed recesses 30 of a type suitable for receiving a spanner wrench or other tool whereby to adjust the bushing for regulating the meshing of the gears 11 and 16 with their respective associate pinions and driven gears 10 and 17.

The outer surfaces of the casing adjacent the eccentric bushings are provided with bosses 31 to enable the insertion of set screws 32 engaging the eccentric bushing for securing the same in adjusted position. The ends of the counter shaft 12 are provided with threaded openings 33 for receiving screws 34 whereby to secure cover plates 35 in position over the bushing.

The armature shaft 9 is inserted through an opening 45 in the rear wall of the housing and carries a collar 36 formed with spaced flanges 37. A washer 38 is mounted on the inner end of the bushing between one of the flanges 37 and the pinion gear 10, the other of the flanges being positioned within the opening, as clearly shown in Figure 6 of the drawings. A substantially U-shaped splash shield 39 is interposed between the washer and the wall of the casing and is secured to the latter by a screw 40 in inverted position for straddling the armature shaft 9 and is seated in the groove 46 formed between the flanges. Lubricant draining from the splash shield will be deposited in the groove whereupon it will be thrown off by centrifugal force.

A washer 44 is fitted in the outer side of the opening 45 the edges of the washer being bent inwardly in the form of a ring 47 seated about the walls of the opening, the edges about the opening of the washer being disposed inwardly at right angles to the ring and terminating in close proximity to the shaft 9. The washer thus serves to stop the escape of any lubricant which might work its way past the splash shield and the collar.

The bottom portion of the casing is adapted to contain a suitable quantity of lubricant which may be drained therefrom by a drain plug 41 and the open top of the casing is covered by a cap 42.

It is obvious that my invention is susceptible to various changes and modifications in construction without departing from the spirit of the invention or the scope of the appended claims, and I accordingly claim all such forms of the device to which I am entitled.

Having thus described my invention, what I claim as new is:

1. A gear assembly comprising a housing having a pinion gear therein, a driven gear operatively connected therewith, a trunnion on one side of the driven gear, a driven shaft at its opposite side and a journal for the trunnion removably supported in the housing.

2. A gear assembly comprising a housing having a pinion gear therein, a driven gear operatively connected therewith, a trunnion on one side of the driven gear, a driven shaft at its opposite side, and a hanger removably supported in the housing having a bearing opening for receiving said trunnion.

3. A gear assembly comprising a housing having a pinion gear therein, a driven gear operatively connected therewith, a trunnion on one side of the driven gear, a driven shaft at its opposite side, a pair of spaced bosses within the housings and a journal hanger removably secured to said bosses for rotatably supporting the trunnions of said driven gear.

4. A drive connection for a griding machine comprising a housing containing a lubricant, a drive shaft inserted through one wall of the housing, a pinion gear on the inner end thereof, a drive gear operatively connected therewith and having a hub journalled in the opposite wall of the housing provided with a recess for receiving a driven shaft, a trunnion axially disposed with respect to the driven gear, a removable hanger rotatably supporting the trunnion and means associated with the drive shaft interposed between the pinion gear and the wall of the housing to prevent escape of lubricant from the housing about the drive shaft.

5. A drive connection for a grinding machine comprising a housing containing a lubricant, a drive shaft inserted through one wall of the housing, a pinion gear on the inner end thereof, a driven gear operatively connected therewith and having a hollow hub at one side journalled in the opposite wall of the housing, said hub being provided with a recess for receiving a driven shaft in one end, a trunnion on the opposite side of the hub, a removable hanger rotatably supporting the trunnion, a grooved collar carried by the drive shaft, a U-shaped splash shield invertedly arranged above the groove of the collar for draining lubricant therein and means encircling the shaft outwardly of the collar to prevent escape of lubricant about the shaft.

In testimony whereof I affix my signature.

WILLIAM W. DRYDEN.